UNITED STATES PATENT OFFICE.

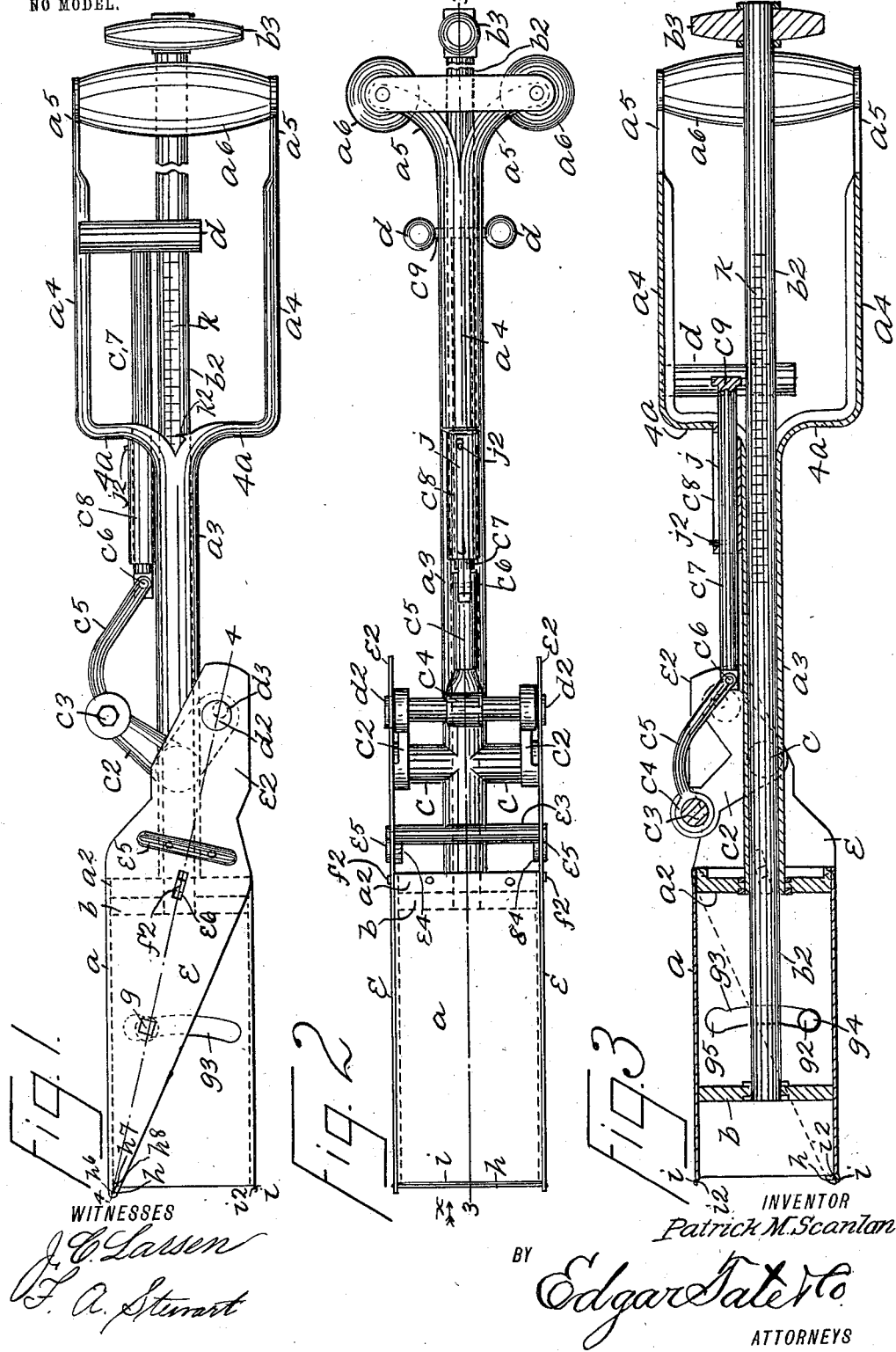
No. 724,050. PATENTED MAR. 31, 1903.
P. M. SCANLAN.
BUTTER CUTTER.
APPLICATION FILED AUG. 9, 1902.
NO MODEL. 2 SHEETS—SHEET 1.
WITNESSES
INVENTOR
Patrick M. Scanlan
BY Edgar Tate & Co.
ATTORNEYS

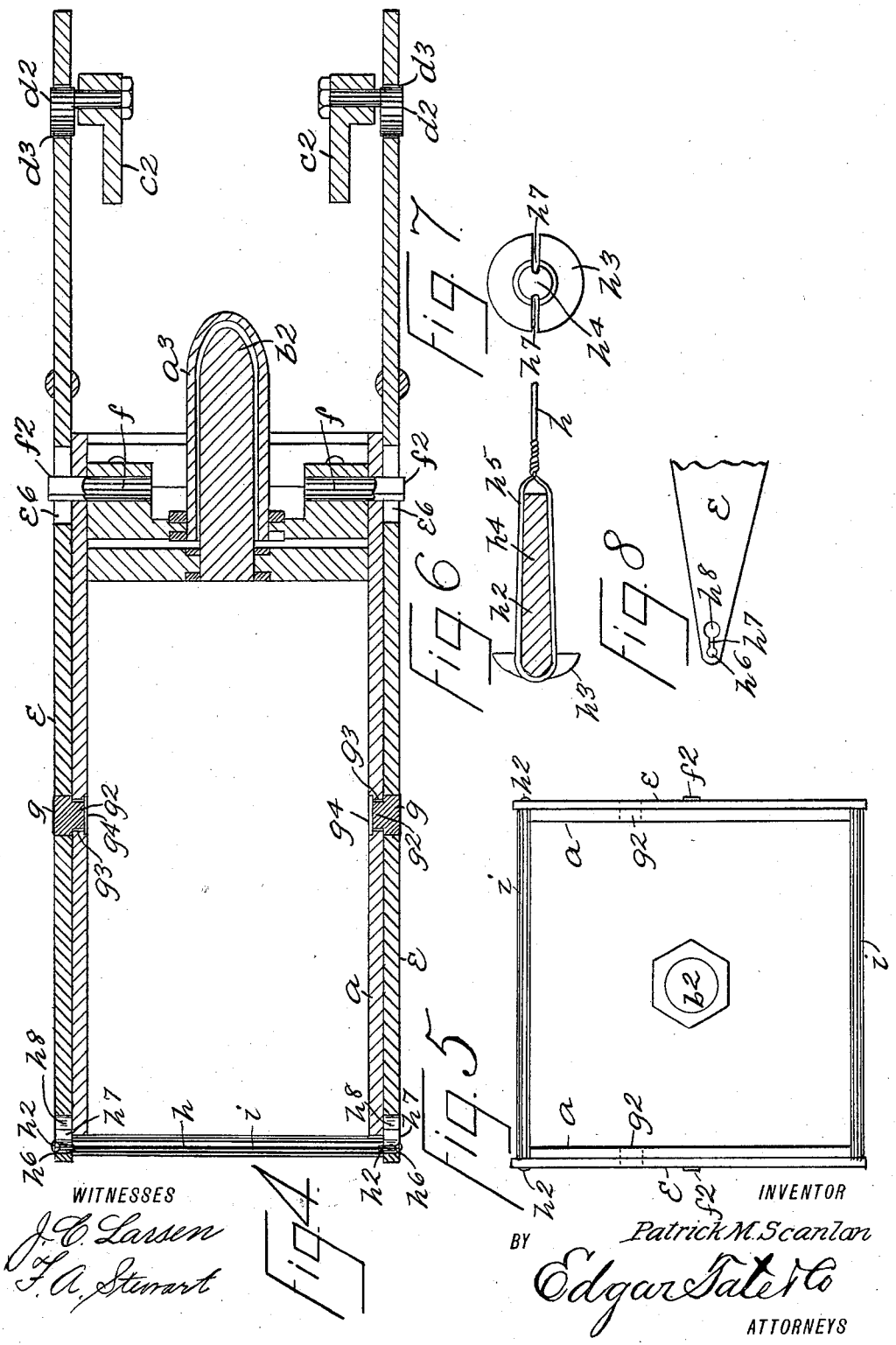

PATRICK M. SCANLAN, OF BROOKLYN, NEW YORK.

BUTTER-CUTTER.

SPECIFICATION forming part of Letters Patent No. 724,050, dated March 31, 1903.

Application filed August 9, 1902. Serial No. 119,009. (No model.)

*To all whom it may concern:*

Be it known that I, PATRICK M. SCANLAN, a citizen of the United States, residing at Brooklyn, in the county of Kings and State of New York, have invented certain new and useful Improvements in Butter-Cutters, of which the following is a full and complete specification, such as will enable those skilled in the art to which it appertains to make and use the same.

The object of this invention is to provide an improved device for cutting butter in tubs and other vessels, so as to remove the butter from the tub or other vessel and at the same time divide it into pound weights for retailing and similar purposes, a further object being to provide a device of the class specified by which butter, cheese, lard, and similar substances may be cut into blocks of any desired form weighing a pound or any other desired amount; and with these and other objects in view the invention consists in a device of the class specified constructed as hereinafter described and claimed.

The invention is fully disclosed in the following specification, of which the accompanying drawings form a part, in which the separate parts of my improvement are designated by suitable reference characters in each of the views, and in which—

Figure 1 is a side view of my improved butter-cutter; Fig. 2, a plan view thereof; Fig. 3, a section on the line 3 3 of Fig. 2; Fig. 4, a section on the line 4 4 of Fig. 1 and on an enlarged scale; Fig. 5, an end view looking in the direction of the arrow $x$ of Fig. 2 and on an enlarged scale; Fig. 6, an end view of a cutter-wire which I employ and showing its attachments; Fig. 7, an end view of the attachment of the cutter-wire, and Fig. 8 a side view of one end of one of the arms which operate the cutter-wire.

In the practice of my invention I provide an oblong rectangular casing $a$, which is preferably square in cross-section and which is preferably composed of sheet metal and one end of which is closed by a head $a^2$, which is secured therein in any desired manner. The head $a^2$ is provided with a tube $a^3$, which is secured therein and which passes therethrough, and said tube is provided at its outer end with arms $a^4$, the outer ends of which are provided with laterally-directed arms $a^5$, which are provided at both sides with a handle $a^6$.

Within the casing $a$ is a plunger $b$, to which is secured a rod $b^2$, which passes outwardly through the tube $a^3$ and between the arms $a^4$ and between the separate pairs of arms $a^5$ and between the handles $a^6$ and is also provided with a handle $b^3$. The tube $a^3$ at a predetermined distance from the head $a^2$ of the casing $a$ is provided with laterally-directed bearings $c$, on which are mounted at each side a crank-lever $c^2$, and the corresponding arms of the crank-levers $c^2$ are rigidly connected by a cross-rod $c^3$, on which is loosely mounted the tubular head $c^4$ of an arm $c^5$, which is preferably curved upwardly and outwardly, as shown, and the end of which is curved back in the direction of the tube $a^3$ and toward the arms $a^4$, and loosely connected with said arm at $c^6$ is a rod $c^7$, which passes through a sleeve $c^8$, secured to the tube $a^3$, adjacent to one of the arms $c^4$, and the rod $c^7$ also passes through the base of the said arm $a^4$ and is provided with a cross-head $c^9$, which is connected to the handles $d$. The arms $a^4$ are provided with laterally-directed members $4^a$, which connect them with the tube $a^3$, and said arms $a^4$ are parallel, and the laterally-directed members $4^a$ of the arms $a^4$ facilitate the operation of the handles $d$ and the rod $c^7$, as hereinafter described. The other arms of the crank-levers $c^2$ are provided each with an eccentric $d^2$, and these eccentrics fit in circular openings $d^3$, formed in the ends $e^2$ of the cutter-arms $e$, and these cutter-arms $e$ are flat and fit against or adjacent to the opposite sides of the casing $a$ and are rigidly connected between the bearings $c$ of the crank-levers $c^2$ and the end of said casing $a$ by a cross-piece $e^3$, having parallel end arms $e^4$, which are secured to the inner sides of the cutter-arms $e$, and side pieces $e^5$ are secured to the outer sides of the cutter-arms $e$ and to the arms $e^4$ of the cross-piece $e^3$ by pins, screws, or other devices which pass through the cutter-arms $e$, the object of this construction being to securely brace and hold the said cutter-arms $e$. The cutter-arms $e$ are provided with slots $e^6$, and secured in the head $a^2$ of the casing $a$ are pins $f$, which are provided with annular heads $f^2$, which pass outwardly through the slots $e^6$, and secured in the cutter-arms $e$ centrally of the casing $a$ are blocks $g$, having journals $g^2$, which fit in and move in transverse slots $g^3$, formed in the sides of the casing $a$, and the journals $g^2$ are provided with heads $g^4$, which are slightly larger than the slots $g^3$, and said slots $g^3$ are enlarged at one end, as shown at $g^5$, so as to permit of the journals $g^3$ being removed therefrom outwardly. The slots $g^3$ of the casing $a$ are curved, the convex side thereof being in the direction of the head $a^2$, and the heads $g^4$ of the journals $g^3$ are countersunk in the inner walls of the casing $a$.

The outer ends of the cutter-arms $e$ carry a cutter-wire $h$, and this wire is provided at each end with an attachment $h^2$, consisting of a head $h^3$, having a shank $h^4$, around which the wire $h$ is passed in the form of a loop $h^5$, as shown in Fig. 6, and said attachment is provided with side grooves $h^7$, adapted to receive said wire, and the cutter-arms $e$ are each provided on the outer edge thereof with a small opening $h^6$, connected by a slot $h^7$ with a larger opening $h^8$. The cutter-wire $h$ and its end attachments are shown on a much larger scale in Figs. 6 and 7, and in practice the end attachments are adapted to be passed outwardly through the opening $h^8$ in the arms $e$ and then moved through the slots $h^7$ into the small opening $h^6$, where the cutter-wire is securely held. The opposite sides of the casing $a$ are provided at the open end with a small projection $i$, having in its inner side a groove $i^2$, adapted to receive the cutter-wire $h$, and said cutter-wire is preferably made of steel or ordinary piano wire, and all the rest of the device is preferably made of nickel-plated material.

I also preferably form in the sleeve $c^8$ a longitudinal slot $j$, and secured in the rod $c^7$ is a pin $j^2$, movable in said slot, the object of which is to limit the movement of the rod $c^7$, and in practice I preferably form on the rod $b^2$ a scale $k$ and provide one of the members $4^a$ with a pointer $k^2$, and this scale may be used to measure the amount of butter or other material cut from a tub or other receptacle, as hereinafter described. This last object, however, may be accomplished by making the casing $a$ of such size that when the plunger $b$ rests against the head $a^2$ the said casing will exactly hold a pound or any other amount previously fixed upon.

In operating this device, supposing the parts to be in the position shown in Fig. 3, the rod $b^2$ is drawn outwardly until the plunger $b$ rests against the head $a^2$ of the casing $a$, as shown in dotted lines in Figs. 1 and 2. In this position of the parts the cutter-wire $h$ is resting in one of the grooves $i^2$ at one side of the open end of the casing $a$, and the open end of said casing is forced into the butter or other material by means of the handles $a^6$ as far as it will go or until the butter or other material strikes the head $b$. The rod $c^7$ is then pulled outwardly by means of the handles $d$, and in this operation the cutter-wire is moved transversely across the open end of the casing $a$ by means of the cutter-arms $e$, and the butter or other material in the casing $a$ is severed from the bulk of the butter or other material. The casing $a$ is then removed, and the rod $b^2$ is forced inwardly, and this operation causes the plunger $b$ to force the butter or other material out of the casing $a$, and said butter or other material may be deposited on a plate or on any suitable receptacle prepared therefor. In this operation the cutter-wire moves evenly and transversely across the open end of the casing $a$, the arms $e$ or the free ends thereof also moving in the same manner, and the cutter-wire is held closely adjacent to the open end of the casing by means of the slots $g^3$ of the sides of said casing and the journals $g^2$ employed therein, said arms being also capable of a slight longitudinal movement at the same time by reason of the slots $c^6$ and the pins $f^2$ employed therein, together with the eccentric $d^2$, which turn in the ends $e^2$ of said arms.

The object of the handles $a^6$ on the tube $a^3$ is to facilitate the use of the rod $b^2$ in forcing the material out of the casing $a$, as in this operation the handles $a^6$ are grasped by the fingers of the hand, while the handle $b^3$ is held by the thumb and palm of the hand, and the rod $c^7$ may be drawn outwardly by simply grasping the handles $d$, and in the operation of forcing said rod inwardly or in the direction of the casing $a$ the members $4^a$ of the handles $a^4$ are grasped by the fingers, while the handles $d$ of the rod $c^7$ are held by the thumb or thumbs and palms of the hand or hands.

This device is simple in construction and operation and perfectly adapted to accomplish the result for which it is intended, and changes in and modifications of the construction described may be made without departing from the spirit of my invention or sacrificing its advantages.

The cutter-wire $h$ may be removed from the ends of arms $e$ whenever desired, and said arms are made of spring material, and the outer ends thereof may be swung outwardly so as to remove the trunnions $g^2$ from the slots $g^3$, and the said arms may then be detached from the eccentrics $d^2$, and the object of connecting the arms $e$ by the cross-piece $e^3$ is to form a frame, of which said arms constitute a part and to render the operation of said arms more positive and complete.

Having fully described my invention, what I claim as new, and desire to secure by Letters Patent, is—

1. A device of the class described, comprising a casing open at one end and closed at the other, a tube connected centrally with the closed end of said casing and provided with handles, a plunger placed in said casing, and provided with a rod passing through said tube and having a handle, side bearings connected with said tube at a predetermined distance from the closed end of the casing, crank-levers connected with said bearings, cutter-arms connected with said crank-levers and fitting adjacent to the opposite sides of the casing, a rod movable longitudinally of said tube and provided with a handle at one end and connected with said levers at the other end, and a cutter-wire connected with the free ends of the cutter-arms and movable transversely of the open end of the casing, substantially as shown and described.

2. A device of the class described comprising a casing open at one end and closed at the other, a tube connected centrally with the closed end of said casing and provided with handles, a plunger placed in said casing and provided with a rod passing through said tube and having a handle, side bearings connected with said tube at a predetermined distance from the closed end of the casing, crank-levers connected with said bearings, cutter-arms connected with said crank-levers and fitting adjacent to the opposite sides of the casing, a rod movable longitudinally of said tube and provided with a handle at one end and connected with said levers at the other end, and a cutter-wire connected with the free ends of the cutter-arms and movable transversely of the open end of the casing, said cutter-arms being capable of a combined longitudinal and swinging movement whereby the cutter-wire is moved straight across the open end of said casing, substantially as shown and described.

In testimony that I claim the foregoing as my invention I have signed my name, in presence of the subscribing witnesses, this 7th day of July, 1902.

PATRICK M. SCANLAN.

Witnesses:
F. A. STEWART,
C. E. MULREANY.